United States Patent
Mager

(10) Patent No.: US 11,995,185 B2
(45) Date of Patent: *May 28, 2024

(54) CLASSIFYING RANSOM NOTES IN RECEIVED FILES FOR RANSOMWARE PROCESS DETECTION AND PREVENTION

(71) Applicant: Endgame, Inc., Arlington, VA (US)

(72) Inventor: Mark Mager, Arlington, VA (US)

(73) Assignee: Endgame, Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/722,210

(22) Filed: Apr. 15, 2022

(65) Prior Publication Data

US 2022/0237292 A1 Jul. 28, 2022

Related U.S. Application Data

(63) Continuation of application No. 16/528,280, filed on Jul. 31, 2019, now Pat. No. 11,308,208.

(60) Provisional application No. 62/714,633, filed on Aug. 3, 2018.

(51) Int. Cl.
*G06F 21/56* (2013.01)
*G06F 21/55* (2013.01)

(52) U.S. Cl.
CPC .......... *G06F 21/565* (2013.01); *G06F 21/554* (2013.01); *G06F 2221/034* (2013.01)

(58) Field of Classification Search
CPC ................ G06F 21/565; G06F 21/554; G06F 2221/034; H04L 63/1451
See application file for complete search history.

(56) References Cited

U.S. PATENT DOCUMENTS

| | | |
|---|---|---|
| 11,308,208 B2 | 4/2022 | Mager |
| 2004/0078319 A1 | 4/2004 | Madhavan et al. |
| 2007/0027728 A1 | 2/2007 | Schuver et al. |
| 2012/0221486 A1* | 8/2012 | Leidner ................ G06Q 40/08 705/36 R |
| 2015/0135262 A1* | 5/2015 | Porat ..................... G06F 21/552 726/1 |
| 2016/0065599 A1 | 3/2016 | Hovor et al. |
| 2016/0321453 A1* | 11/2016 | Yang ..................... G06F 21/562 |
| 2018/0024893 A1 | 1/2018 | Sella et al. |
| 2018/0211039 A1 | 7/2018 | Tamir et al. |
| 2019/0332769 A1* | 10/2019 | Fralick ...................... H04L 9/30 |
| 2020/0019822 A1* | 1/2020 | Kothandaraman .. G06Q 10/067 |
| 2020/0042705 A1 | 2/2020 | Mager |
| 2020/0074327 A1* | 3/2020 | Yamamoto ............ G06Q 10/06 |

OTHER PUBLICATIONS

Andronio, Nicolo et al., "HelDroid: Dissecting and Detecting Mobile Ransomware", International Conference on Image Analysis and Processing, Naples, Italy, Sep. 9-13, 2013, pages.

* cited by examiner

*Primary Examiner* — Evans Desrosiers
(74) *Attorney, Agent, or Firm* — Quinn IP Law

(57) ABSTRACT

The present invention analyzes the text of a received file to determine if the file likely is a forensic artifact of a ransomware attack on a computer system. If the computer system concludes that the file is likely an artifact of a ransomware attack, the system suspends or terminates all related processes, thereby minimizing the harm caused to the computer system.

20 Claims, 5 Drawing Sheets

CLASSIFYING RANSOM NOTES IN RECEIVED FILES FOR RANSOMWARE PROCESS DETECTION AND PREVENTION

CROSS REFERENCE TO RELATED APPLICATIONS

This application claims priority to U.S. patent application Ser. No. 16/528,280, filed on Jul. 31, 2019 titled "Classifying Ransom Notes in Received Files for Ransomware Process Detection and Prevention," which claims priority to U.S. Provisional Patent Application No. 62/714,633, filed on Aug. 3, 2018, and titled "Classifying Ransom Notes in Received Files for Ransomware Process Detection and Prevention," all of which are hereby incorporated by reference herein, including all references and appendices, for all purposes.

FIELD OF THE INVENTION

The present invention analyzes the text of a received file to determine if the file likely is a forensic artifact of a ransomware attack on a computing device. If the computing device concludes that the file is likely an artifact of a ransomware attack, the system terminates or ignores all related processes, thereby minimizing the harm caused to the computing device.

BACKGROUND OF THE INVENTION

Cyber attackers utilize increasingly creative attacks to infiltrate computers and networks. With reference to FIG. 1, a common cyber attack mechanism is to send ransomware file 103 from client device 101a operated by a cyber attacker to an unsuspecting user. For example, the cyber attacker might send an email attaching ransomware file 103 to server 102, which in this example is an email server that the user can access from exemplary client device 101b. The cyber attacker also might upload ransomware file 103 to server 102 and send a message to the user to access file 103.

With reference to FIG. 2, believing ransomware file 103 to be legitimate, the user might interact with the file, such as by opening ransomware file 103. This action will then cause malicious code 104 to be executed. Malicious code 104 can then attack client device 101b and potentially any network or device connected to client device 101b, such as server 102. Malicious code 104 typically will erase or corrupt stored data within a computing device or gather and transmit data from a computing device to another device operated by the cyber attacker.

Ransomware file 103 typically comprises textual ransom note 105 from the cyber attacker. Ransom note 105 is a forensic artifact produced by ransomware processes. This artifact typically take the form of text or image files and may be written to disk as a ransomware process begins to encrypt files and in many cases may be written to multiple directories which are accessed by the process.

Ransom note 105 tends to follow a general template that alerts the reader that the system has been compromised, files have been encrypted, and that a ransom payment (generally in the form of a cryptocurrency such as the cryptocurrency known by the trademark"BITCOIN") must be paid to obtain the means to decrypt and retrieve their data.

Prior art ransomware detection systems and methods include a two step process. The first step involves static classification of executable files as benign or malicious. The second step involves runtime analysis of process behavior to determine signs of widespread encryption or data corruption. In cases where the first step fails, the second step typically requires a multitude of file change events to occur in order to properly classify the behavior of a process, by which time malicious code 104 may already have caused damage to client device 101b and possibly any network and device coupled to client device 101b.

What is needed is an improved approach that is able to detect ransomware much faster than prior art systems so that the malicious code can be neutralized before it inflicts any further damage.

BRIEF SUMMARY OF THE INVENTION

The disclosed embodiments accurately identify a file as ransomware much more quickly than in the prior art. Ransom note 105 can be differentiated from typical text documents found on computing devices with a high degree of accuracy through an approach that involves sentiment analysis applied to classifying tokenized and lemmatized text data. A framework for obtaining file creation events on a computing device is utilized to obtain a constant stream of files to classify. In instances when a file is deemed to be a ransom note, the source process is suspended and the user is alerted to the anomalous activity.

One embodiment comprises a method of determining that a file received by a computing device comprises malicious code, the method comprising: receiving a file, extracting or generating raw text from the file, analyzing the raw text to generate a result, generating a score based on the result, and taking protective action if the score exceeds a predetermined threshold.

Another embodiment comprises a computer-readable storage medium storing instructions that, when executed by a computer, cause the computer to perform the following steps: receive a file, extract or generate raw text from the file, analyze the raw text to generate a result, generate a score based on the result, and perform protective action if the score exceeds a predetermined threshold.

Another embodiment comprises a computing device comprising a processor and memory, wherein during operation the processor is configured by software instructions storedin the memory to: receive a file, extract or generate raw text from the file, tokenize the raw text to generate tokens, lemmatize the tokens to generate lemmatized tokens, vectorize the lemmatized tokens to generate a vector set, generate a score based on the vector set, and perform protective action if the score exceeds a predetermined threshold.

DETAILED DESCRIPTION OF THE INVENTION

Figure 1:
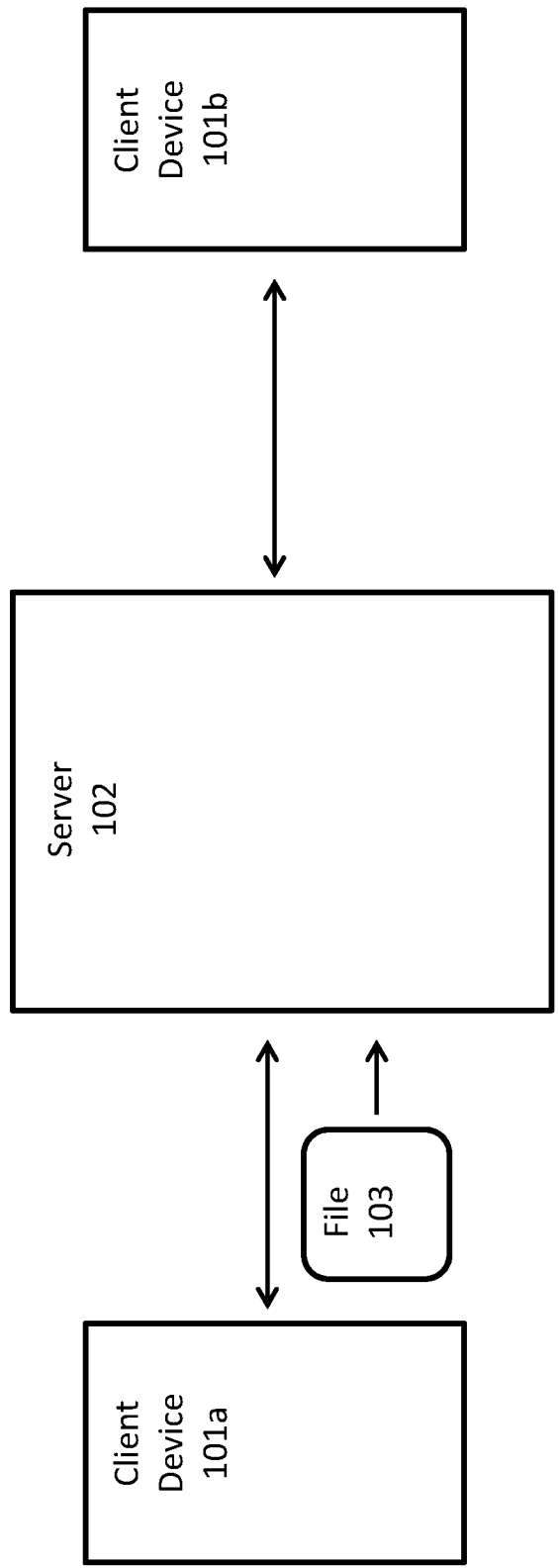
FIG. 1 depicts a prior art system where a file is transmitted from a client device to a server.
Figure 2:
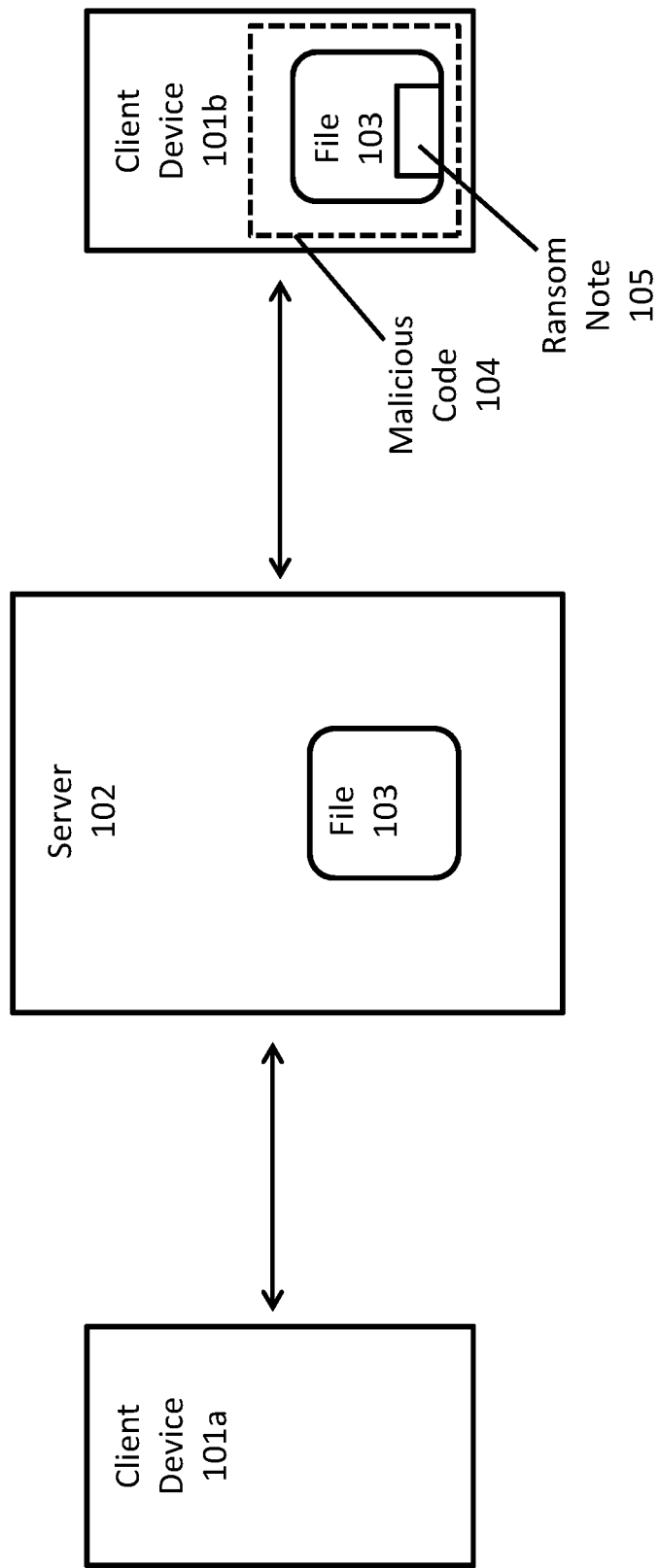
FIG. 2 depicts the prior art system where the file comprises malicious code and a ransom note.
Figure 3:
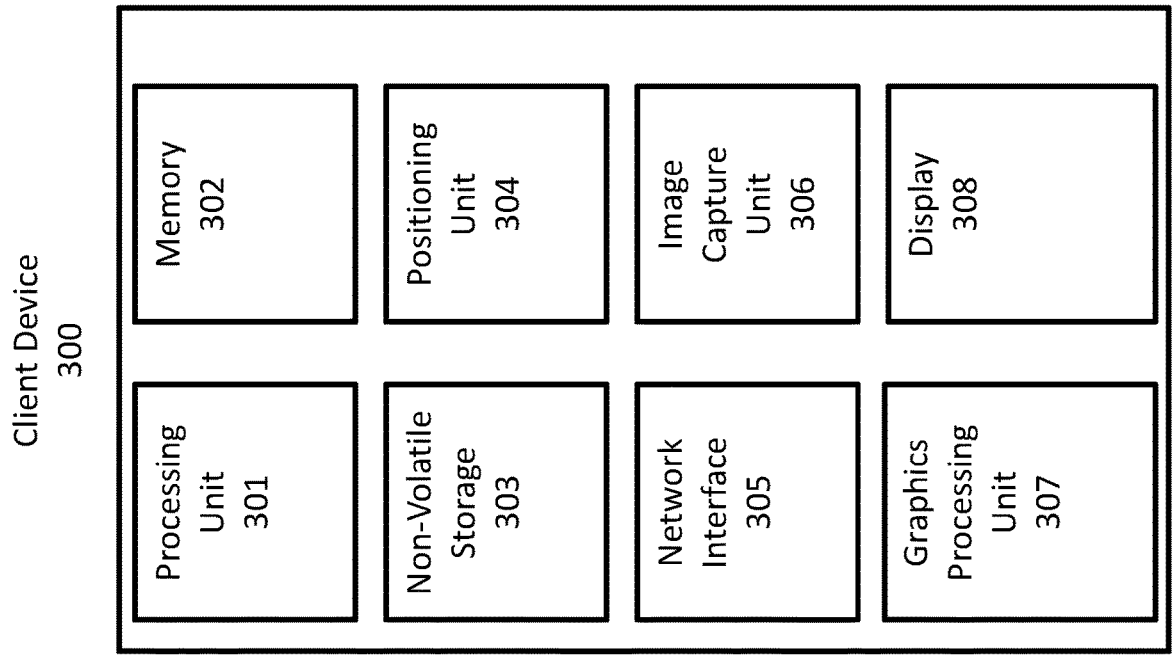
FIG. 3 depicts hardware components of a client device.

FIG. 3 depicts hardware components of client device 300. These hardware components are known in the prior art. Client device 300 is a computing device that comprises processing unit 301, memory 302, non-volatile storage 303, positioning unit 304, network interface 305, image capture unit 306, graphics processing unit 307, and display 308. Client device 300 can be a smartphone, notebook computer, tablet, desktop computer, gaming unit, wearable computing device such as a watch or glasses, or any other computing device.

Processing unit 301 optionally comprises a microprocessor with one or more processing cores. Memory 302 optionally comprises DRAM or SRAM volatile memory. Non-volatile storage 303 optionally comprises a hard disk drive or flash memory array. Positioning unit 304 optionally comprises a GPS unit or GNSS unit that communicates with GPS or GNSS satellites to determine latitude and longitude coordinates for client device 300, usually output as latitude data and longitude data. Network interface 305 optionally comprises a wired interface (e.g., Ethernet interface) or wireless interface (e.g., 3G, 4G, GSM, 802.11, protocol known by the trademark "BLUETOOTH," etc.). Image capture unit 306 optionally comprises one or more standard cameras (as is currently found on most smartphones and notebook computers). Graphics processing unit 307 optionally comprises a controller or processor for generating graphics for display. Display 308 displays the graphics generated by graphics processing unit 307, and optionally comprises a monitor, touchscreen, or other type of display.

Figure 4:
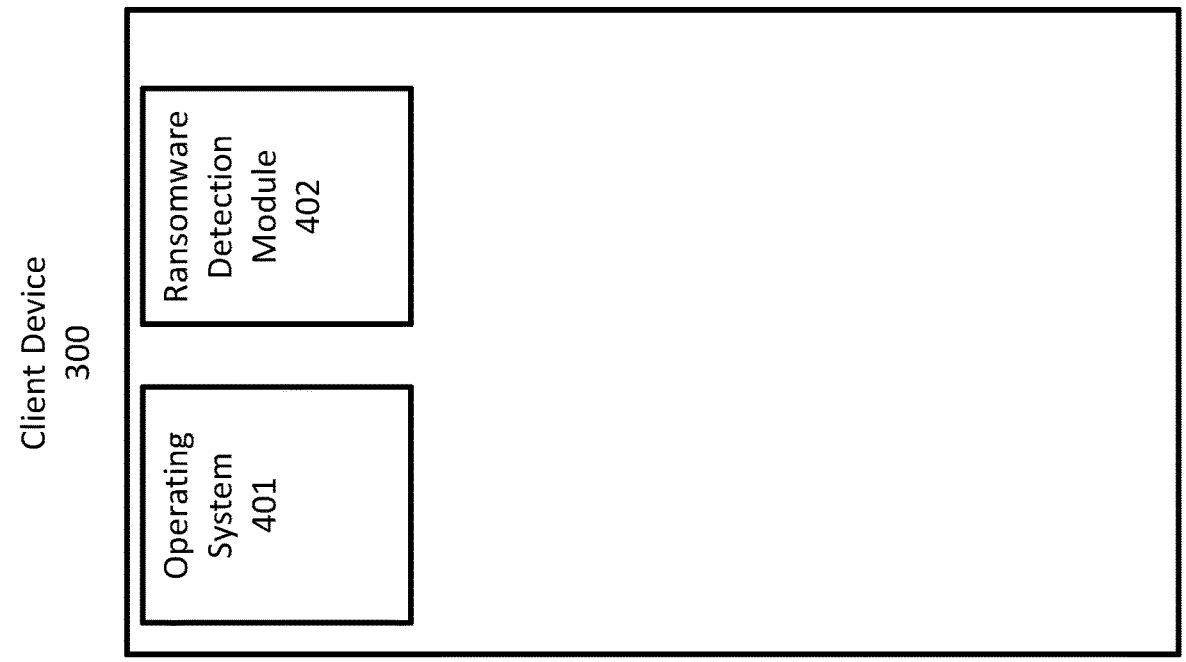
FIG. 4 depicts software components of the client device.

FIG. 4 depicts software components of client device 300. Client device 300 comprises operating system 401 (such as the operating systems known by the trademarks "WINDOWS," "LINUX," "ANDROID," "IOS," or others) and ransomware detection module 402. Ransomware detection module 402 comprises lines of software code executed by processing unit 301 to perform the functions described below.

For example, client device 300 can be a smartphone sold with the trademark "GALAXY" by Samsung or "IPHONE" by Apple, and ransomware detection module 402 can be a downloadable app installed on the smartphone. Client device 300 also can be a notebook computer, desktop computer, game system, or other computing device, and ransomware detection module 402 can be a software application running on client device 300. Ransomware detection module 402 forms an important component of the inventive aspect of the embodiments described herein, and ransomware detection module 402 is not known in the prior art. For this reason, client device 300 is an improvement over prior art client devices 101*a* and 101*b*.

Ransomware detection module 402 executes a runtime classification of text data as benign or characteristic of a ransom note along with the necessary framework to support file change event retrieval and source process mitigation. When used in conjunction, this solution encompasses an effective ransomware process detection capability.

When ransomware successfully executes on a host such as client device 101*b*, there are typically two categories of files written to disk: encrypted files containing malicious code 104 and ransom notes 105. Ransom notes 105 comprise text or image data that conveys the message of the author in the hopes of soliciting a ransom payment. Since most ransom notes have the same objective in mind, ransom notes tend to include similar language and phrasing across multiple samples and families regardless of their origin. This serves as a baseline for training and producing an effective model that can differentiate between benign text data typically found on a computing device and that of text data that is characteristic of a ransom note.

In order to classify the appropriate text data, ransomware detection module 402 comprises a framework to support reading in file change events on a host. This framework leverages internal mechanisms on the host to log file paths as they are created or modified in real time, restricting entries to the specific file extensions or types desired for analysis. These file paths are sent to a module that handles classification of the data.

Figure 5:
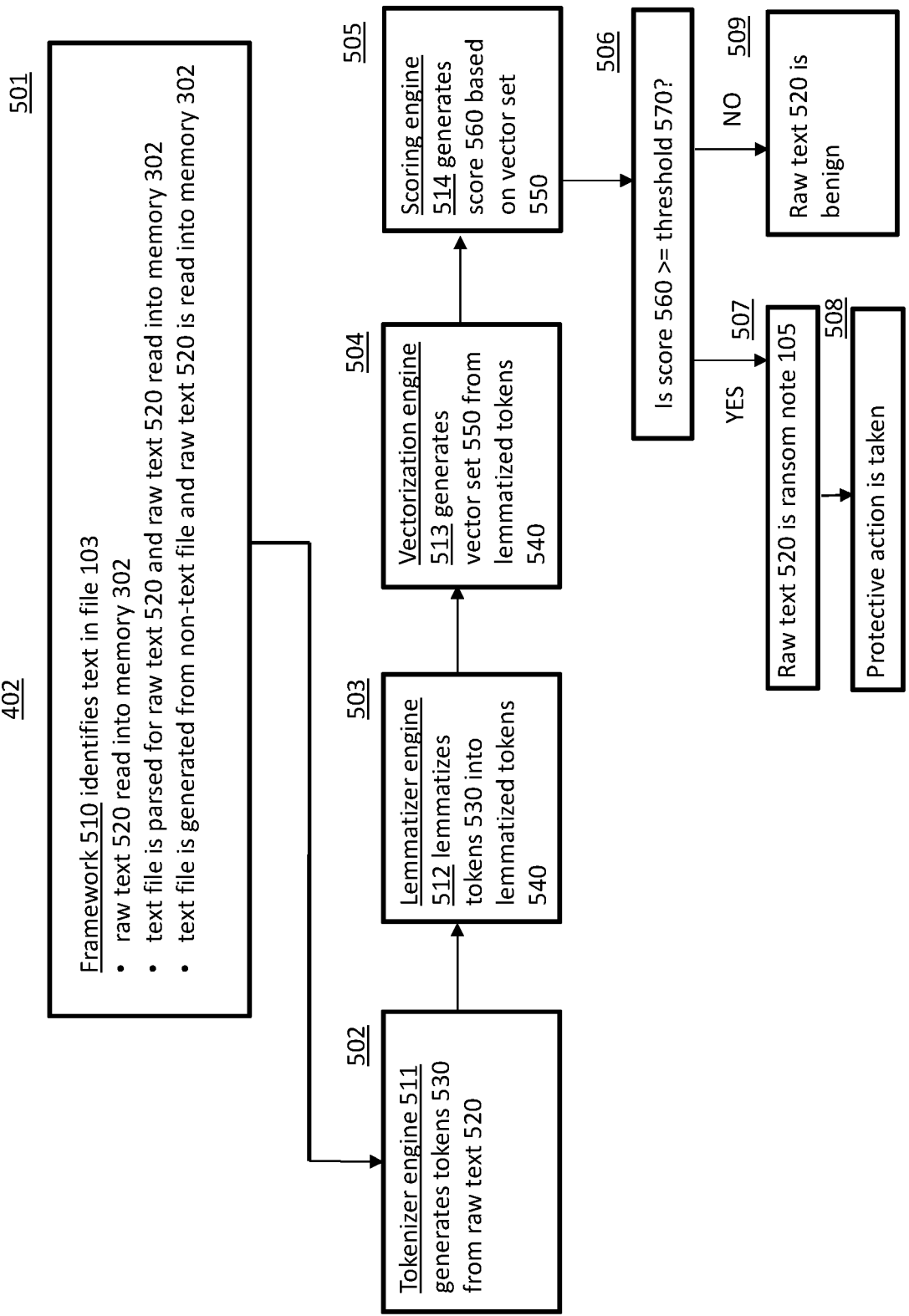
FIG. 5 depicts a ransomware detection module in the client device.

FIG. 5 depicts additional detail regarding ransomware detection module 402. Ransomware detection module 402 comprises framework 510, tokenizer engine 511, lemmatizer engine 512, vectorization engine 513, and scoring engine 514.

In the first step (step 501), file 103 (e.g., ransomware.exe) is received. Framework 510 identifies any text contained in file 103. Raw text 520 (e.g., ransomnote.txt) contained in file 103 is directly read into memory. Formatted text files (e.g. HTML, RTF) are parsed for their raw text 520 content, and raw text 520 is read into memory. For image files, the framework leverages optical character recognition (OCR) to extract all visual text (which can be converted into raw text 520) contained within the images. This OCR capability is necessary for extracting and classifying text from images used by ransomware samples when locking the user interface or changing the desktop wallpaper.

In the second step (step 502), tokenizer engine 511 generates tokens 530 from raw text 520, which identifies unique individual words and strips out punctuation, stop words, indecipherable words, and other data that is deemed unnecessary.

In the third step (step 503), lemmatizer engine 512 lemmatizes tokens 520 into lemmatized tokens 540, which utilize a more standard vocabulary. Lemmatized tokens 540 comprise a list of words that serve as the core data block used for classification.

In the fourth step (step 504), vectorization engine 513 generates vector set 550, which is a vectorized representation of the data contained within lemmatized tokens 540, mapping each word to features present within a previously trained model according to the principles of term frequency-inverse document frequency (TF-IDF).

In the fifth step (step 505) scoring engine 514 generates score 560 based on vector set 550 by using a model trained on such features.

In the sixth step (step 506), score 560 is compared to pre-selected threshold 570. If score 560 is greater than or equal to threshold 570, then raw text 520 can be deemed to be a ransom note 105 (step 507). In that instance, protective action will be taken (step 508), which can include framework 510 suspending the source process that created or modified file 103. A message can be generated to alert the user that a ransomware process was detected on the host and suspended. If score 560 is less than threshold 570 in step 506, then raw text is deemed benign (step 509) and no protective action is taken.

In the alternative, a score equal to or exceeding threshold 570 can indicate that raw text 520 is benign text and a score below threshold 570 can indicate that raw text 520 is ransom note 105.

This method and software apparatus embodied in ransomware detection module 402 fills in a missing gap found in the prior art between static classification of ransomware executables and behavioral detection of ransomware processes through detection of widespread encryption and data corruption. The classification of text and image data allows for an effective and quick ransomware process detection method that minimizes data loss. This approach provides for a much more effective end-to-end approach to preventing and detecting ransomware when used in concert with current detection technologies.

It is to be understood that the present invention is not limited to the embodiment(s) described above and illustrated herein, but encompasses any and all variations evident from the above description. For example, references to the present invention herein are not intended to limit the scope of any claim or claim term, but instead merely make reference to one or more features that may be eventually covered by one or more claims.

What is claimed is:

1. A method of determining that a file received by a computing device comprises malicious code, the method comprising:
   receiving a file in hardware memory in response to a file change event;
   extracting visual text from the file and converting the visual text to the raw text
   using optical character recognition processes, the file being an image file type used by ransomware or malicious code when locking a user interface or changing a desktop wallpaper;
   analyzing the raw text to generate a result; generating a score based on the result; and
   taking protective action if the score exceeds a predetermined threshold, the predetermined threshold indicating the raw text being characteristic of a ransom note contained within a file comprising malicious code, and the protective action comprising automatically suspending or terminating a process that caused the file change event.

2. The method of claim 1, wherein the analyzing step comprises:
   tokenizing the raw text to generate tokens;
   lemmatizing the tokens to generate lemmatized tokens; and
   vectorizing the lemmatized tokens to generate the result using a trained model based on term frequency-inverse document frequency, wherein the result comprises a vector set.

3. The method of claim 2, wherein the protective action comprises:
   suspending or terminating in real time a process associated with the file.

4. The method of claim 3, wherein the protective action further comprises generating an alert for a user.

5. The method of claim 2, wherein the protective action comprises:
   generating an alert for a user.

6. The method of claim 1, wherein the file includes encrypted malicious code.

7. The method of claim 6, wherein the protective action further comprises generating an alert for a user.

8. The method of claim 1, wherein the protective action comprises:
   generating an alert for a user.

9. A computer-readable storage medium storing instructions that, when executed by a computer, cause the computer to perform the following steps:
   receive a file in hardware memory in response to a file change event;
   extract visual text from the file and convert the visual text to raw text using optical character recognition processes, the file being an image file type used by ransomware when locking a user interface or changing a desktop wallpaper;
   analyze the raw text to generate a result comprising a vector set; generate a score based on the result; and
   perform protective action if the score exceeds a predetermined threshold, the predetermined threshold indicating the raw text being characteristic of a ransom note contained within a file comprising malicious code, and the protective action comprising automatically suspending or terminating a process that caused the file change event.

10. The computer-readable storage medium of claim 9, wherein the analyze step comprises:
    tokenizing the raw text to generate tokens;
    lemmatizing the tokens to generate lemmatized tokens; and
    vectorizing the lemmatized tokens to generate the result using a trained model based on term frequency-inverse document frequency, wherein the result comprises a vector set.

11. The computer-readable storage medium of claim 10, wherein the protective action comprises:
    suspending or terminating in real time a process associated with the file.

12. The computer-readable storage medium of claim 11, wherein the protective action further comprises generating an alert for a user.

13. The computer-readable storage medium of claim 10, wherein the protective action comprises: generating an alert for a user.

14. The computer-readable storage medium of claim 9, wherein the file includes encrypted malicious code.

15. The computer-readable storage medium of claim 14, wherein the protective action further comprises generating an alert for a user.

16. The computer-readable storage medium of claim 9, wherein the protective action comprises: generating an alert for a user.

17. A computing device comprising a processor and memory, wherein during operation the processor is configured by software instructions stored in the memory to:
    receive a file in hardware memory in response to a file change event;
    extract visual text from the file and convert the visual text to raw text using
    optical character recognition processes, the file being an image file type used by ransomware or malicious code when locking a user interface or changing a desktop wallpaper;
    tokenize the raw text to generate tokens;
    lemmatize the tokens to generate lemmatized tokens;
    vectorize the lemmatized tokens using a trained model based on term frequency-inverse document frequency to generate a vector set;
    generate a score based on the vector set; and
    perform protective action if the score exceeds a predetermined threshold, the predetermined threshold indicating the raw text being characteristic of a ransom note contained within a file comprising malicious code, and the protective action comprising automatically suspending or terminating a process that caused the file change event.

18. The computing device of claim 17, wherein the protective action comprises:
    suspending or terminating in real time a process associated with the file.

19. The computing device of claim 18, wherein the protective action further comprises:
    generating an alert for a user.

20. The computing device of claim 17, wherein the protective action comprises: generating an alert for a user.

\* \* \* \* \*